(12) United States Patent
Kitawaki et al.

(10) Patent No.: US 11,341,995 B2
(45) Date of Patent: May 24, 2022

(54) ALUMINUM ALLOY SHEET FOR MAGNETIC DISK AND PRODUCTION METHOD THEREFOR, AND MAGNETIC DISK USING SAID ALUMINUM ALLOY SHEET FOR MAGNETIC DISK

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Yu Igarashi, Tokyo (JP); Keisuke Kamiya, Tokyo (JP); Yu Matsui, Tokyo (JP); Makoto Yonemitsu, Tokyo (JP); Ryo Sakamoto, Tokyo (JP); Hideyuki Hatakeyama, Tokyo (JP); Hiroki Ota, Tokyo (JP)

(73) Assignees: UACJ CORPORATION, Tokyo (JP); FURUKAWA ELECTRIC CO.. LTD., Tokyo (JP)

( * ) Notice: Subject to any disclaimer, the term of this patent is extended or adjusted under 35 U.S.C. 154(b) by 0 days.

(21) Appl. No.: 17/284,187

(22) PCT Filed: Oct. 15, 2019

(86) PCT No.: PCT/JP2019/040500
§ 371 (c)(1),
(2) Date: Apr. 9, 2021

(87) PCT Pub. No.: WO2020/080363
PCT Pub. Date: Apr. 23, 2020

(65) Prior Publication Data
US 2021/0319806 A1    Oct. 14, 2021

(30) Foreign Application Priority Data
Oct. 15, 2018   (JP) .................................. 2018-194477

(51) Int. Cl.
*G11B 5/73*     (2006.01)
*C22C 21/02*    (2006.01)
*C23C 18/32*    (2006.01)

(52) U.S. Cl.
CPC .......... *G11B 5/73919* (2019.05); *C22C 21/02* (2013.01); *C23C 18/32* (2013.01)

(58) Field of Classification Search
None
See application file for complete search history.

(56) References Cited

U.S. PATENT DOCUMENTS 5,939,164 A    8/1999   Kubo et al.
6,059,902 A *  5/2000   Yoshihara ............... C22C 21/02
                                                  148/417

(Continued)

FOREIGN PATENT DOCUMENTS

JE    6316511 B2    4/2018
JP    63089577 A    4/1988

(Continued)

OTHER PUBLICATIONS

Derwent Abstract of WO 2016-068293 A1 (Year: 2016).*

(Continued)

*Primary Examiner* — Kevin M Bernatz
(74) *Attorney, Agent, or Firm* — Greer Burns & Crain Ltd.

(57) ABSTRACT

An aluminum alloy sheet for a magnetic disk, a method for manufacturing same, and a magnetic disk using same. The aluminum alloy sheet is made of an aluminum alloy comprising 0.10 to 3.00 mass % of Fe, 0.003 to 1.000 mass % of Cu, and 0.005 to 1.000 mass % of Zn, with a balance of Al and unavoidable impurities, wherein a value obtained by dividing a difference in an area ratio (%) of second phase particles between a region (A) and a region (B) by an (Continued)

average value of area ratios (%) of second phase particles in the regions (A) and (B) is 0.05 or less, the region (A) being a region from a sheet thickness center plane to a front surface of the sheet, and the region (B) being a region from the sheet thickness center plane to a rear surface of the plate.

8 Claims, 2 Drawing Sheets

(56) References Cited

U.S. PATENT DOCUMENTS

| | | | |
|---|---|---|---|
| 2002/0149876 | A1 | 10/2002 | Sakata et al. |
| 2009/0004044 | A1 | 1/2009 | Sawada et al. |
| 2012/0014834 | A1 | 1/2012 | Sawada et al. |
| 2012/0134875 | A1 | 5/2012 | Namba et al. |
| 2017/0327930 | A1* | 11/2017 | Kitawaki .................. C22F 1/04 |
| 2019/0066724 | A1 | 2/2019 | Nakamura et al. |
| 2020/0211595 | A1* | 7/2020 | Yukimatsu ......... G11B 5/73919 |
| 2020/0377984 | A1 | 12/2020 | Kitawaki et al. |
| 2020/0381015 | A1 | 12/2020 | Kitawaki et al. |

FOREIGN PATENT DOCUMENTS

| | | | |
|---|---|---|---|
| JP | 09235640 | A | 9/1997 |
| JP | 11175963 | A | 7/1999 |
| JP | 2002313061 | A | 10/2002 |
| JP | 2004292862 | A | 10/2004 |
| JP | 2009006386 | A | 1/2009 |
| JP | 2011088207 | A | 5/2011 |
| JP | 2012072487 | A | 4/2012 |
| JP | 6316511 | B2 | 4/2018 |
| JP | 6389546 | B1 | 9/2018 |
| JP | 6389577 | B1 | 9/2018 |
| JP | 6402229 | B1 | 10/2018 |
| JP | 6437583 | B2 | 12/2018 |
| WO | 2011043150 | A1 | 4/2011 |
| WO | 2016068293 | A1 | 5/2016 |

OTHER PUBLICATIONS

Toshio Baba et al.; "Effects of TiB2 and TiAl3 Particles on Refinement of Cast Structure of Pure Aluminum" Sumitomo Light Metal Technical Reports, Sumitomo Light Metal Industries, Ltd., Jul. 1974, vol. 15, No. 3, pp. 1-7 (English abstract).

Yoshio Baba et al.; "Effects of TiB2 and TiAl3 Particles on Refinement of Cast Structure of Pure Aluminum" Sumitomo Light Metal Technical Reports, Sumitomo Light Metal Industries, Ltd., Jul. 1974, vol. 15, No. 3, pp. 1-7 (English abstract).

Takahashi, Koichi; "Introduction—The Manufacturing Technique of Aluminum Product~ from top process to lower process~"; General incorporated foundation Japan Institute of Light Metals, May 20, 2017, pp. 6-15.

Morishita, Makoto; "Improvement of Quality and Productivity on Aluminum Direct Chill Casting"; Jul. 2011; pp. 32-35.

News Release of Nippon Light Metal Co., Ltd.; "VCC: Vertical Continuous Casting"; Jun. 6, 2014; pp. 1-3; https://www.nikkeikin.co.jp/news/whatsnew/vcc_vertical_continuous_casting.html.

ISR and Written Opinion issued in Int'L App. No. PCT/JP2019/040500, dated Dec. 24, 2019.

Decision on Opposition dated May 19, 2020 of JP patent No. 6506897(with English machine translation).

Notice of Reasons for Revocation dated Feb. 6, 2020 of JP patent No. 6506897(with English machine translation).

Office Action of JP application No. 2018-194477 dated Feb. 22, 2019 (with English machine translation).

* cited by examiner

ALUMINUM ALLOY SHEET FOR MAGNETIC DISK AND PRODUCTION METHOD THEREFOR, AND MAGNETIC DISK USING SAID ALUMINUM ALLOY SHEET FOR MAGNETIC DISK

This is a National Phase Application filed under 35 U.S.C. § 371, of International Application No. PCT/JP2019/040500, filed Oct. 15, 2019, the contents of which are incorporated by reference.

TECHNICAL FIELD

The present disclosure relates to an aluminum alloy sheet for a magnetic disk, which has a favorable fluttering characteristic, a production method therefor, and a magnetic disk using the aluminum alloy sheet for a magnetic disk.

BACKGROUND ART

Magnetic disks used for storage devices of computers are produced using substrates that have a favorable platability and excellent mechanical characteristics and workability. For example, a magnetic disk is produced from a substrate or the like, which is based on an aluminum alloy according to JIS 5086 (comprising 3.5 to 4.5 mass % of Mg, 0.50 mass % or less of Fe, 0.40 mass % or less of Si, 0.20 to 0.70 mass % of Mn, 0.05 to 0.25 mass % of Cr, 0.10 mass % or less of Cu, 0.15 mass % or less of Ti, and 0.25 mass % or less of Zn, with the balance of Al and unavoidable impurities).

A general magnetic disk is produced by first making an annular aluminum alloy substrate, plating the aluminum alloy substrate, and then depositing a magnetic substance on a surface of the aluminum alloy substrate.

For example, an aluminum alloy magnetic disk using the above-mentioned JIS 5086 alloy is produced according to the following production steps: First, an aluminum alloy material comprising desired chemical components is cast, and the resultant ingot is subjected to hot rolling, and then to cold rolling, to make a rolled material having a thickness required for the magnetic disk. It is preferable to anneal the rolled material in the cold rolling and/or the like as needed. Then, an annular piece is punched from the rolled material, and, for removing distortion or the like caused in the above production step, the annular aluminum alloy sheets are stacked and subjected to pressure annealing in which the stacked sheets are annealed while applying pressure thereto from the opposite sides to flatten the sheets, thereby making an annular aluminum alloy substrate.

The annular aluminum alloy substrate thus made is subjected to lathing, grinding, degreasing, etching, and zincate treatment (Zn substitution treatment), as a pretreatment, and then subjected to electroless plating with Ni—P which is a hard non-magnetic metal, as an undercoat treatment. After polishing the plated surface, a magnetic substance is sputtered onto the Ni—P electroless plated surface of the substrate, to produce an aluminum alloy magnetic disk.

Incidentally, in recent years, as there are needs of multimedia and the like, magnetic disks are required to have an increased capacity and an increased density, and a further increased speed. To increase the capacity, the number of magnetic disks mounted in a storage device is increasing, and accordingly, it is required to reduce the thickness of magnetic disks.

Further, as the magnetic disk is reduced in thickness and increased in speed, a lowered rigidity of the magnetic disk and an increased fluid force due to high-speed rotation causes an increase in exciting force, which makes disk flutter liable to occur. This is because when the magnetic disk is rotated at a high speed, an unstable airflow is generated between the disks, and the airflow causes vibration (fluttering) of the magnetic disk. Such a phenomenon presumably occurs because the low rigidity of the substrate causes an increase in the vibration of the magnetic disk, and a head cannot follow the change. When fluttering occurs, the positioning error of the head as a reader increases. Therefore, there is a strong demand for reducing disk flutter.

Further, due to an increased density of the magnetic disk, the magnetic area per bit is made even more miniaturized. As a result of this miniaturization, a reading error is more liable to occur due to the deviation of a positioning error of the head, and hence there is a strong demand for reducing disk flutter which is a major cause of the positioning error of the head.

Under such circumstances, in recent years, an aluminum alloy substrate for a magnetic disk, which has high strength and a characteristic of small disk flutter, is strongly desired and being studied. For example, it has been proposed to mount an airflow suppression component having a plate opposed to a disk in a hard disk drive. Patent Literature 1 proposes a magnetic disk device having an air spoiler disposed upstream of an actuator. The air spoiler weakens the airflow toward the actuator on the magnetic disk to thereby reduce vibration of the magnetic disk caused by wind turbulence. Further, the air spoiler weakens the airflow on the magnetic disk to thereby suppress disk flutter. Further, Patent Literature 2 proposes a method for improving the rigidity of the aluminum alloy sheet by increasing the content of Si that contributes to the improvement of the rigidity.

However, the method disclosed in Patent Literature 1 is different in the fluttering suppression effect depending on a difference in spacing between the installed air spoiler and the magnetic disk substrate, and requires the high precision of components, which gives rise to an increase in the cost of the components.

The method for increasing the Si content, disclosed in Patent Literature 2, is capable of reducing displacement of broad peaks in an approximate range of 300 to 1500 Hz where flattering appears, but is incapable of reducing displacement of broad peaks in an approximate range of about 1500 to 2000 Hz, and hence it has been impossible to attain the desired goal of a fluttering characteristic.

CITATION LIST

Patent Literature

Patent Literature 1: Unexamined Japanese Patent Application Publication No. 2002-313061
Patent Literature 2: International Publication No. WO 2016/068293

SUMMARY OF INVENTION

Technical Problem

The present disclosure was made under such actual circumstances with an objective to provide an aluminum alloy sheet for a magnetic disk, which has high strength and is excellent in the fluttering characteristic of the magnetic disk, a method for producing the same, and a magnetic disk using the aluminum alloy sheet for a magnetic disk.

Solution to Problem

Namely, claim 1 of the present disclosure describes an aluminum alloy sheet for a magnetic disk, including an aluminum alloy comprising 0.10 to 3.00 mass % of Fe, 0.003 to 1.000 mass % of Cu, and 0.005 to 1.000 mass % of Zn, with a balance of Al and unavoidable impurities, wherein a value obtained by dividing a difference in an area ratio (%) of second phase particles between a region (A) and a region (B) by an average value of area ratios (%) of second phase particles in the regions (A) and (B) is 0.50 or less, the region (A) being a region from a sheet thickness center plane to a front surface of the sheet, and the region (B) being a region from the sheet thickness center plane to a rear surface of the sheet.

Claim 2 of the present disclosure describes that the aluminum alloy further comprises one or more elements selected from a group comprising 0.1 to 3.0 mass % of Mn, 0.1 to 5.0 mass % of Si, 0.1 to 8.0 mass % of Ni, 0.1 to 6.0 mass % of Mg, 0.01 to 1.00 mass % of Cr, and 0.01 to 1.00 mass % of Zr, in accordance with claim 1.

Claim 3 of the present disclosure describes that the aluminum alloy further comprises one or more elements selected from a group comprising Ti, B, and V, of which a total content is 0.005 to 0.500 mass %, in accordance with any one of claim 1 or 2.

Claim 4 of the present disclosure describes a magnetic disk wherein an electroless Ni—P plating-treated layer and a magnetic substance layer thereon are provided on a surface of an aluminum alloy substrate including an aluminum alloy sheet for a magnetic disk, in accordance with any one of claims 1 to 3.

Claim 5 of the present disclosure describes a method for producing the aluminum alloy sheet for a magnetic disk, according to any one of claims 1 to 3, the method including a molten metal producing step of producing a molten metal using the aluminum alloy, a semi-continuous casting step of casting an ingot from the produced molten metal by a semi-continuous casting method, a hot rolling step of hot-rolling the ingot, and a cold rolling step of cold-rolling a hot-rolled plate, wherein the semi-continuous casting step is started within one to sixty minutes after a refiner is added to the molten metal in the molten metal producing step.

Claim 6 of the present disclosure describes a method for producing the aluminum alloy sheet for a magnetic disk, according to any one of claims 1 to 3, the method including a molten metal producing step of producing a molten metal using the aluminum alloy, a continuous casting step of casting a cast plate from the produced molten metal by a continuous casting method, and a cold rolling step of cold-rolling the cast plate continuously cast, wherein the continuous casting step is started within one to sixty minutes after a refiner is added to the molten metal in the molten metal producing step.

Advantageous Effects of Invention

The present disclosure makes it possible to provide an aluminum alloy sheet for a magnetic disk, which has high strength and is excellent in the fluttering characteristic of the magnetic disk, a method for producing the same, and a magnetic disk using the aluminum alloy sheet for a magnetic disk.

DESCRIPTION OF EMBODIMENTS

Figure 1A:
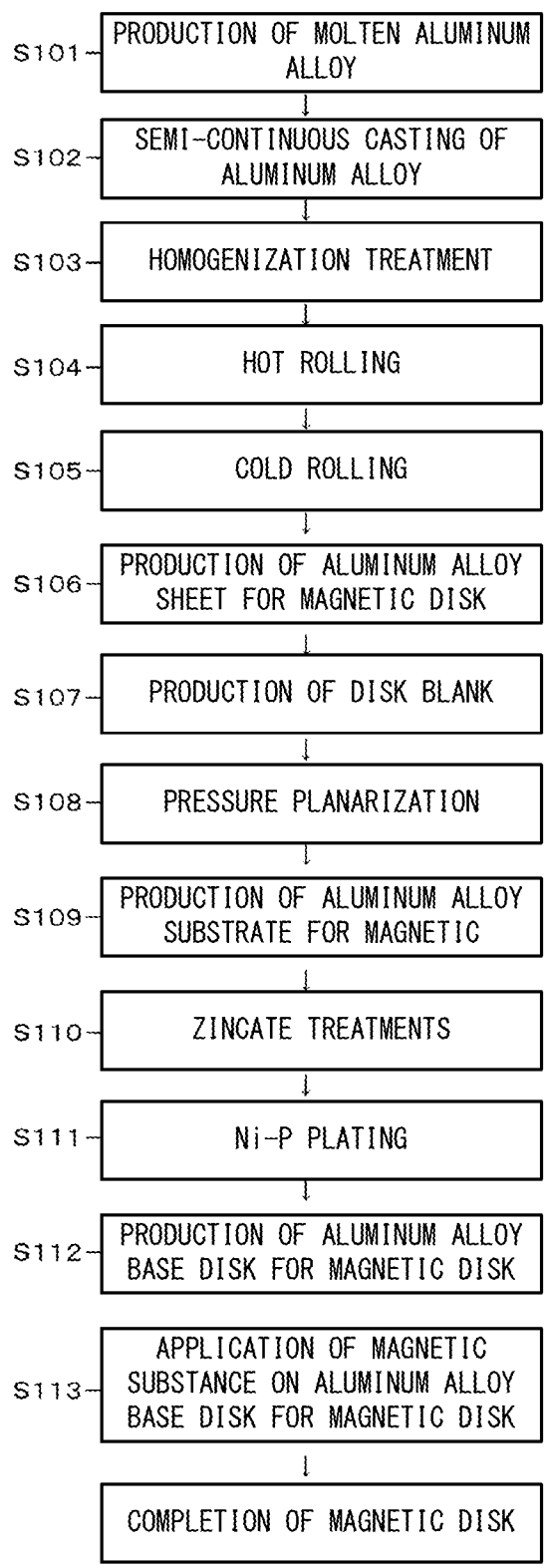
FIG. 1 is a flow diagram showing a method for producing an aluminum alloy sheet for a magnetic disk and the magnetic disk according to the present disclosure.

A magnetic disk according to the present disclosure uses an aluminum alloy sheet for a magnetic disk, according to the present disclosure, as a material. First, the aluminum alloy sheet for a magnetic disk is made. Then, the aluminum alloy sheet for a magnetic disk is punched to obtain a disk blank having an annular shape and the disk blank is pressure annealed to make a blank, whereafter the blank is worked by lathing and griding into an aluminum alloy substrate for a magnetic disk. Further, the aluminum alloy substrate for a magnetic disk is subjected to degreasing, etching, zincate treatment, and Ni—P plating to make an aluminum alloy base disk for a magnetic disk. Finally, a magnetic substance layer is provided on the aluminum alloy base disk for a magnetic disk to thereby form a magnetic disk.

The present inventors have focused on relationships between the strength and fluttering characteristic of a magnetic disk, and an aluminum alloy sheet as a base material, and intensively studied the relationships. As a result, the inventors have found that an Fe content and second phase particles have significant influence on the fluttering characteristic of the magnetic disk, which is measured in air or in helium.

So, the present inventors have studied, in the aluminum alloy sheet for a magnetic disk, an Fe content and an area ratio of second phase particles in a sheet thickness direction as a metallographic structure. As a result, the inventors have found that by using, as a base material, an aluminum alloy sheet for a magnetic disk, which contains 0.10 to 3.00 mass % (hereinafter, simplified as "%") of Fe, 0.003 to 1.000% of Cu, and 0.005 to 1.000% of Zn, wherein a value obtained by dividing a difference in an area ratio (%) of second phase particles between a region (A) and a region (B) by an average value of area ratios (%) of second phase particles in the regions (A) and (B) is 0.50 or less, the region (A) being a region from a sheet thickness center plane to a front surface of the sheet, and the region (B) being a region from the sheet thickness center plane to a rear surface of the sheet, the fluttering characteristic of the magnetic disk is improved, and thus completed the present disclosure.

A. Aluminum alloy sheet for a magnetic disk, according to the present disclosure Hereinafter, the aluminum alloy sheet for a magnetic disk, according to the present disclosure, (hereinafter referred to as "the aluminum alloy sheet according to the present disclosure" or simply as "the aluminum alloy sheet") will be described in detail.

1. Alloy Composition

Hereinafter, aluminum alloy components constituting an aluminum alloy sheet in which Al—Fe-based alloys are used, according to the present disclosure, and contents thereof will be described.

Fe:

Fe is an essential element, which exists principally in the form of second phase particles (Al—Fe-based intermetallic compounds and the like) that are partly solid-dissolved in a matrix, and has the effect of improving the strength and fluttering characteristic of the magnetic disk. When vibrations are applied to such a material, vibrational energy is immediately absorbed due to viscous flow in the interface between the second phase particles and the matrix, to give a very favorable fluttering characteristic to the material. An Fe content of less than 0.10% in the aluminum alloy does not give sufficient strength and fluttering characteristic. On the other hand, an Fe content of more than 3.00% causes generation of a large number of coarse Al—Fe-based intermetallic compounds particles. The coarse Al—Fe-based intermetallic compounds particles drop off during etching, zincate treatment, lathing, and grinding, to form large recesses, thereby causing deterioration of the smoothness of the plated surface and plating peeling. Further, this causes lowering of workability in a rolling step. Accordingly, the content of Fe in the aluminum alloy is set in a range of 0.10 to 3.0%. The content of Fe is preferably in a range of 0.40 to 2.00%, and more preferably in a range of 0.80 to 1.80%.

Cu:

Cu is an essential element, which reduces the amount of dissolution of Al during zincate treatment, and causes a zincate film to be uniformly, thinly, and closely attached, to thereby have the effect of improving the smoothness and adhesion in the following plating step. A Cu content of less than 0.003% in the aluminum alloy causes the zincate film to be non-uniform and pits to be formed in the plated surface, thereby lowering the smoothness of the plated surface. Further, plating peeling is made liable to occur. On the other hand, a Cu content of more than 1.000% in the aluminum alloy causes generation of a large number of coarse Al-Cu-based intermetallic compounds particles. The coarse Al-Cu-based intermetallic compounds particles drop off during etching, zincate treatment, lathing, and grinding, to form large recesses, thereby forming pits in the plated surface and causing deterioration of the smoothness of the plated surface. Further, plating peeling is made liable to occur. Accordingly, the content of Cu in the aluminum alloy is set in a range of 0.003 to 1.000%. The content of Cu is preferably in a range of 0.005 to 0.400%.

Zn:

Zn is an essential element, which reduces the amount of dissolution of Al during zincate treatment, and causes a zincate film to be uniformly, thinly, and closely attached, to thereby have the effect of improving the smoothness and adhesion in the following plating step. A Zn content of less than 0.005% in the aluminum alloy causes the zincate film to be non-uniform and pits to be formed in the plated surface, thereby lowering the smoothness of the plated surface. Further, plating peeling is made liable to occur. On the other hand, a Zn content of more than 1.000% in the aluminum alloy causes the zincate film to be non-uniform and pits to be formed in the plated surface, thereby lowering the smoothness of the plated surface. Further, plating peeling is made liable to occur. Accordingly, the content of Zn in the aluminum alloy is set in a range of 0.005 to 1.000%. The content of Zn is preferably in a range of 0.100 to 0.700%.

To further improve the strength and fluttering characteristic of the magnetic disk, one or more elements selected from 0.1 to 3.0 mass % of M, 0.1 to 5.0 mass % of Si, 0.1 to 8.0 mass % of Ni, 0.1 to 6.0 mass % of Mg, 0.01 to 1.00 mass % of Cr, and 0.01 to 1.00 mass % of Zr may be further contained as first selective elements. Further, one or more elements selected from Ti, B, and V, of which a total content is 0.005 to 0.500 mass %, may be further contained as second selective elements. These selective elements will be described below.

Mn:

Mn exists principally as second phase particles (Al—Mn-based intermetallic compounds and the like) and a solid solution element, and has the effect of improving the strength and fluttering characteristic of the magnetic disk. When vibrations are applied to such a material, vibrational energy is immediately absorbed due to viscous flow in the interface between the second phase particles and the matrix to give a very favorable fluttering characteristic to the material. A Mn content of 0.1% or more in the aluminum alloy is capable of further enhancing the effect of improving the strength and fluttering characteristic of the magnetic disk. Further, a Mn content of 3.00% or less suppresses generation of a large number of coarse Al—Mn-based intermetallic compounds particles. It is possible to suppress the coarse Al—Mn-based intermetallic compounds particles from dropping off during etching, zincate treatment, lathing, and grinding, to form large recesses, thereby even further suppress deterioration of the smoothness of the plated surface and occurrence of plating peeling. Further, it is possible to further suppress lowering of workability in the rolling step. Accordingly, the content of Mn in the aluminum alloy is preferably set in a range of 0.1 to 3.0%, and is more preferably set in a range of 0.1 to 2.0%.

Si:

Si exists principally as second phase particles (Si particles and the like) and has the effect of improving the strength and fluttering characteristic of the magnetic disk. When vibrations are applied to such a material, vibrational energy is immediately absorbed due to viscous flow in the interface between the second phase particles and the matrix, to give a very favorable fluttering characteristic to the material. A Si content of 0.1% or more in the aluminum alloy is capable of further enhancing the effect of improving the strength and fluttering characteristic of the magnetic disk. Further, a Si content of 5.0% or less in the aluminum alloy suppresses generation of a large number of coarse Si particles. It is possible to suppress the coarse Si particles from dropping off during etching, zincate treatment, lathing, and grinding to form large recesses, and further suppress lowering of the smoothness of the plated surface and occurrence of plating peeling. Further, it is possible to further suppress lowering of workability in the rolling step. Accordingly, the content of Si in the aluminum alloy is preferably set in a range of 0.1 to 5.0%, and is more preferably set in a range of 0.1 to 0.4%.

Ni:

Ni exists principally as second phase particles (Al—Ni-based intermetallic compounds and the like) and has the effect of improving the strength and fluttering characteristic of the magnetic disk. When vibrations are applied to such a material, vibrational energy is immediately absorbed due to viscous flow in the interface between the second phase particles and the matrix, to give a very favorable fluttering characteristic to the material. A Ni content of 0.1% or more in the aluminum alloy is capable of further enhancing the effect of improving the strength and fluttering characteristic of the magnetic disk. Further, a Ni content of 8.0% or less in the aluminum alloy suppresses generation of a large number of coarse Al—Ni-based intermetallic compounds particles. It is possible to suppress such coarse Al—Ni-based intermetallic compounds particles from dropping off during etching, zincate treatment, lathing, and grinding to form large recesses, and further suppress lowering of the smoothness of the plated surface and occurrence of plating peeling. Further, it is possible to further suppress lowering of workability in the rolling step. Accordingly, the content of Ni in the aluminum alloy is preferably set in a range of 0.1 to 8.0%, and is more preferably set in a range of 0.1 to 6.0%.

Mg:

Mg exists principally as second phase particles (Mg—Si-based intermetallic compounds and the like) and has the effect of improving the strength and fluttering characteristic of the magnetic disk. A Mg content of 0.1% or more in the aluminum alloy is capable of further enhancing the effect of improving the strength and fluttering characteristic of the magnetic disk. Further, a Mg content of 6.0% or less in the aluminum alloy suppresses generation of a large number of coarse Mg—Si-based intermetallic compounds particles. It is possible to suppress such coarse Mg—Si-based intermetallic compounds particles from dropping off during etching, zincate treatment, lathing, and grinding to form large recesses, and further suppress lowering of the smoothness of the plated surface and occurrence of plating peeling. Further, it is possible to further suppress lowering of workability in the rolling step. Accordingly, the content of Mg in the aluminum alloy is preferably set in a range of 0.1 to 6.0%, and is more preferably set in a range of 0.3 or more and less than 1.0%.

Cr:

Cr exists principally as second phase particles (Al—Cr-based intermetallic compounds and the like) and has the effect of improving the strength and fluttering characteristic of the magnetic disk. A Cr content of 0.01% or more in the aluminum alloy is capable of further enhancing the effect of improving the strength and fluttering characteristic of the magnetic disk. Further, a Cr content of 1.00% or less in the aluminum alloy suppresses generation of a large number of coarse Al—Cr-based intermetallic compounds particles. It is possible to suppress such coarse Al—Cr-based intermetallic compounds particles from dropping off during etching, zincate treatment, lathing, and grinding to form large recesses, and further suppress lowering of the smoothness of the plated surface and occurrence of plating peeling. Further, it is possible to further suppress lowering of workability in the rolling step. Accordingly, the content of Cr in the aluminum alloy is preferably set in a range of 0.01 to 1.00%, and is more preferably set in a range of 0.10 to 0.50%.

Zr:

Zr exists principally as second phase particles (Al—Zr-based intermetallic compounds and the like) and has the effect of improving the strength and fluttering characteristic of the magnetic disk. A Zr content of 0.01% or more in the aluminum alloy is capable of further enhancing the effect of improving the strength and fluttering characteristic of the magnetic disk. Further, a Zr content of 1.00% or less in the aluminum alloy suppresses generation of a large number of coarse Al—Zr-based intermetallic compounds particles. It is possible to suppress such coarse Al—Zr-based intermetallic compounds particles from dropping off during etching, zincate treatment, lathing, and grinding to form large recesses, and further suppress lowering of the smoothness of the plated surface and occurrence of plating peeling. Further, it is possible to further suppress lowering of workability in the rolling step. Accordingly, the content of Zr in the aluminum alloy is preferably set in a range of 0.01 to 1.00%, and is more preferably set in a range of 0.10 to 0.50%.

Ti, B, V:

Ti, B, V form, in a solidification process in casting, second phase particles (particles of borides, such as $TiB_2$, $Al_3Ti$, Ti—V—B, and the like), which become crystal grain nuclei, and therefore it is possible to make crystal grains finer. As a result, platability is improved. Further, finer crystal grains reduce the non-uniformity of the sizes of the second phase particles and unevenness in the strength and fluttering characteristic of the magnetic disk. However, it is impossible to obtain the above-described effects when the total of the contents of Ti, B, and V is less than 0.005%. On the other hand, even when the total of the contents of Ti, B, and V is more than 0.500%, the effects are saturated, and therefore, it is impossible to obtain more noticeable improvement effects than the above. Accordingly, when Ti, B and V are added, the total of the contents of Ti, B, and V is preferably set in a range of 0.005 to 0.500%, and is more preferably set in a range of 0.005 to 0.100%. Note that the total refers to the amount of one element when only one element of Ti, B, and V is contained, to the total of two elements when the two elements are contained, and to the total of three elements when all the three elements are contained.

Other Elements

The balance of the aluminum alloy for use in the present disclosure comprises Al and unavoidable impurities. Here, as the unavoidable impurities, there may be mentioned Ga and Sn, and the characteristics of the aluminum alloy sheet obtained in the present disclosure are not spoiled when each content is less than 0.10% and also the total content is less than 0.20%.

2. Distribution State of Second Phase Particles

Next, a distribution state of second phase particles in the aluminum alloy sheet according to the present disclosure will be described.

In the aluminum alloy sheet according to the present disclosure, as to a metallographic structure, it is defined that a value obtained by dividing a difference in an area ratio (%) of second phase particles between a region (A) and a region (B) by an average value of area ratios (%) of second phase particles in the regions (A) and (B) is 0.50 or less, the region (A) being a region from a sheet thickness center plane to a front surface of the sheet, and the region (B) being a region from the sheet thickness center plane to a rear surface of the sheet. Note that the difference in the area ratio (%) of second phase particles between the region (A) and the region (B) can be plus in one case and minus in another case, and hence in the present disclosure, the difference is defined as an absolute value.

Here, the second phase particles mean precipitates and crystals, and specifically, refer to Al—Fe-based intermetallic compounds ($Al_3Fe$, $Al_6Fe$, $Al_6$(Fe, Mn), Al—Fe—Si, Al—Fe—Mn—Si, Al—Fe—Ni, Al—Cu—Fe, and the like), Al—Mn-based intermetallic compounds ($Al_6Mn$, A-Mn—Si), Si particles, Al—Ni-based intermetallic compounds ($Al_3Ni$ and the like), Al—Cu-based intermetallic compounds ($Al_2Cu$ and the like), Mg—Si-based intermetallic compounds ($Mg_2Si$ and the like), Al—Cr-based intermetallic compounds ($Al_7Cr$ and the like), Al—Zr-based intermetallic compounds ($Al_3Zr$ and the like), and the like.

In the metallographic structure of the aluminum alloy sheet according to the present disclosure, by setting the value obtained by dividing the difference in the area ratio (%) of second phase particles between a region (A) and a region (B) by the average value of area ratios (%) of second phase particles in the regions (A) and (B) to 0.50 or less, the aluminum alloy sheet has a favorable flatness and exhibits an excellent fluttering characteristic. The second phase particles are much higher in hardness than an Al matrix, and therefore, if the area ratios of second phase particles in the regions (A) and (B) are largely different, the regions (A) and (B) are different in hardness from each other. As a result, when subjected to pressure annealing, the regions (A) and (B) are different in the amount of deformation from each other, and hence it is impossible to obtain a favorable flatness even if pressure annealing is performed. A magnetic disk made by using such an aluminum alloy material having such large flatness variation has large air resistance during operation thereof and is lowered in the fluttering characteristic. On the other hand, a magnetic disk made by using the aluminum alloy having small flatness variation can suppress lowering of the fluttering characteristic. Note that excellent flatness refers to a flatness of 30 μm or less.

In the metallographic structure of the aluminum alloy sheet according to the present disclosure, in a case where the value obtained by dividing the difference in the area ratio (%) of second phase particles between the region (A) and the region (B) by the average value of area ratios (%) of second phase particles in the regions (A) and (B), the region (A) being a region from the sheet thickness center plane to the front surface of the sheet, and the region (B) being a region from the sheet thickness center plane to the rear surface of the sheet, is larger than 0.50, the regions (A) and (B) are largely different in the area ratio of second phase particles, and therefore it is impossible to obtain a favorable flatness even if pressure annealing is performed. Therefore, air resistance during operation of a magnetic disk device is large, which lowers the fluttering characteristic thereof. For this reason, it is defined that the value obtained by dividing the difference in the area ratio (%) between the regions (A) and (B) by the average value of area ratios (%) of the regions (A) and (B) is 0.50 or less, preferably 0.40 or less. Here, the average value refers to an arithmetic mean value. Note that composition (COMPO) images of SEM are photographed in the regions (A) and (B), areas of second phase particles different in contrast from the matrix are calculated, and the calculated areas are divided by respective areas of the whole field of view of the regions (A) and (B) to determine ratios (%) of second phase particles, which are referred to as the area ratios (%) of second phase particles in the regions (A) and (B). In the COMPO image of SEM, Al—Fe-based intermetallic compounds and the like of second phase particles appear as an image of contrast more white than the matrix whereas Mg—Si-based intermetallic compounds and the like appear as an image of contrast more black than the matrix.

3. Thickness

In the embodiment of the present disclosure, it is preferable that the thickness of the aluminum alloy sheet is 0.35 mm or more. When the thickness of the aluminum alloy sheet is less than 0.35 mm, there is a possibility of being deformed by acceleration caused by a fall which can occur when the hard disk drive is mounted, except that the deformation can be suppressed by increasing the yield strength. Note that a thickness of more than 1.90 mm of the aluminum alloy sheet improves the fluttering characteristic but reduces the number of disks which can be mounted in the hard disk and therefore is unsuitable. Accordingly, the thickness of the aluminum alloy sheet is more preferably set in a range of 0.35 to 1.90 mm, and is further preferably set in a range of 0.50 to 1.40 mm.

B. Method for Producing the Aluminum Alloy Sheet According to the Present Disclosure The method will be described with reference to flowcharts shown in FIG. 1. Note that steps other than a step S104 and a step S105 are the same between (a) and (b), and hence some of the steps are described without specifying (a) or (b). First, production of molten aluminum alloy (step S101) and semi-continuous casting of aluminum alloy (step S102) to cold rolling (step S105) in (a) and production of molten aluminum alloy (step S101), continuous casting of aluminum alloy (step S102), and cold rolling (step S105) in (b) each are a process for production of an aluminum alloy sheet (step S106). Next, production of a disk blank using the aluminum alloy sheet (step S107) and pressure planarization treatment (step S108) are a process for production of an aluminum alloy substrate (step S109). Further, a step of zincate treatment using the aluminum alloy substrate (step S110) and Ni—P plating (step S111) are a process for production of an aluminum alloy base disk (step S112). Finally, a step of depositing a magnetic substance on the aluminum alloy base disk (step S113) completes the magnetic disk.

In the first place, the step of producing an aluminum alloy sheet will be described. First, a molten aluminum alloy material having a composition described above is produced by heating and melting according to a usual method (step S101). Then, aluminum alloy is cast from the prepared molten aluminum alloy material by a semi-continuous casting (DC casting) method or a continuous casting (CC casting) method (step S102). Here, the DC casting method and the CC casting method are as follows:

In the DC casting method, a molten metal poured through a spout has its heat removed by a bottom block, a wall of mold cooled by water, and cooling water directly discharged to an outer peripheral portion of an ingot, whereby the molten metal solidifies and is pulled out downward as the ingot.

In the CC casting method, a thin plate is directly cast by supplying molten metal, through a casting nozzle, between a pair of rolls (or a belt caster or a block caster) and performing heat removal from the rolls.

The DC casting method and the CC casting method are largely different in the cooling rate during casting. The CC casting method, which is higher in the cooling rate, is characterized by a smaller size of second phase particles than the size of those by the DC casting method.

In the casting step, it is required to start casting within one to sixty minutes after adding a refiner to molten metal. As the refiner used in casting the aluminum alloy, there may be mentioned an Al—Ti—B-based refiner, an Al—Ti—C-based refiner, and the like. By adding the refiner, $TiB_2$, $Al_3Ti$, TiC and the like contained in the refiner form nuclei of second phase particles and make distribution of the second phase particles more uniform.

Time to elapse after adding the refiner to the molten metal until the start of casting is set to within one to sixty minutes. Note that time to elapse after adding the refiner to the molten metal until the start of casting is preferably set to within five to thirty minutes.

In a case where casting is started within less than one minute after adding the refiner to the molten metal, particles of $TiB_2$ and like other compounds are not uniformly dispersed in the molten metal, so that distribution of second phase particles becomes non-uniform. As a result, the value obtained by dividing the difference in the area ratio (%) of second phase particles between the region (A) and the region (B) by the average value of area ratios (%) of second phase particles in the regions (A) and (B), the region (A) being a region from the sheet thickness center plane to the front surface of the sheet, and the region (B) being a region from the sheet thickness center plane to the rear surface of the sheet, is larger than 0.50.

On the other hand, in a case where casting is started more than sixty minutes after adding the refiner to the molten metal, particles of metal compounds in the molten metal grow to generate a large number of coarse particles of the metal compounds. Such coarse particles of the metal compounds drop off to form large recesses during etching, zincate treatment, lathing, and grinding, which lowers the smoothness of the plated surface to cause occurrence of plating peeling. Therefore, to inhibit generation of a large number of such coarse particles of metal compounds, it is required to start casting within sixty minutes after adding the refiner to the molten metal.

As such coarse particles of metal compounds, there exist those composed by various metals, such as metal elements of aluminum alloy and metal elements added as the refiner, but it is preferable to inhibit generation of a large number of coarse particles of Ti-based compounds, such as $TiB_2$, composed of Ti, B, and V, which are added as refiners. Specifically, by starting casting within sixty minutes after adding a refiner to the molten alloy, it is preferable to make the distribution density of coarse particles of Ti-based compounds, which have circle-equivalent diameters of 15 to 50 μm, equal to five/mm² or less, more preferably one/mm² or less.

Figure 1B:
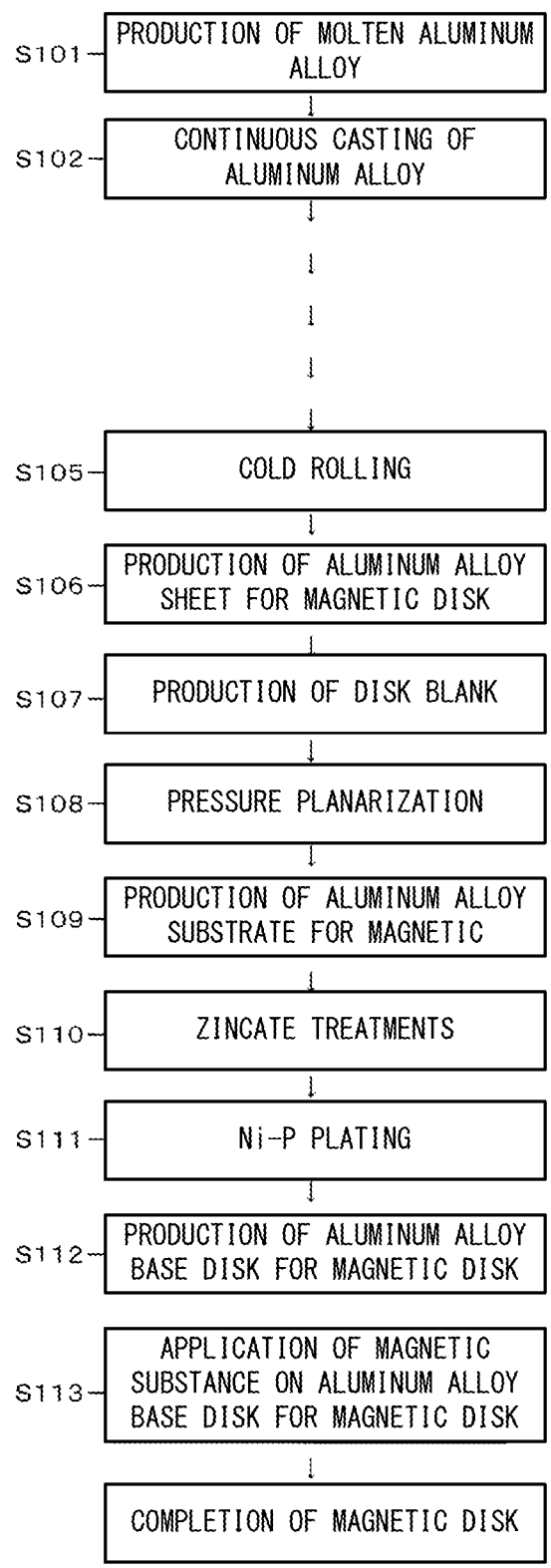
Figure 2:
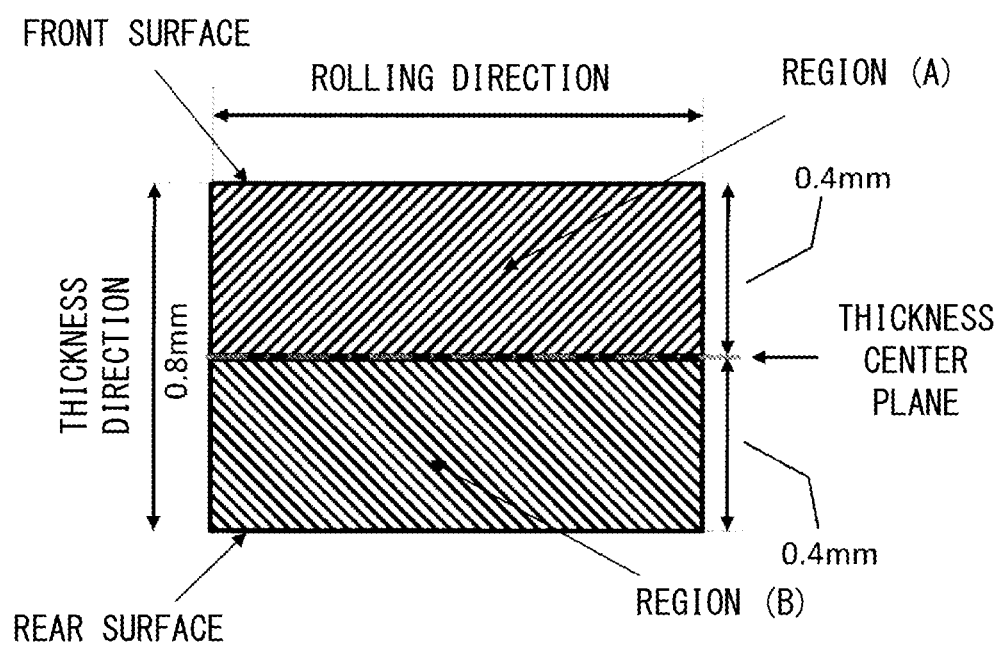
FIG. 2 is a schematic diagram showing a region (A) and a region (B) in an aluminum alloy sheet for a magnetic disk according to the present disclosure, which has a sheet thickness of 0.8 mm.

As shown in (a) of FIG. 1, on the DC-cast aluminum alloy ingot, homogenization treatment is performed as needed (step S103). Homogenization treatment is preferably performed by heating at 280 to 620° C. for 0.5 to 60 hours, more preferably by heating at 300 to 620° C. for one to 24 hours. If the heating temperature during homogenization treatment is lower than 280° C. or the heating time for the same is less than 0.5 hours, the homogenization treatment is insufficient, so that variation in damping ratio between aluminum alloy substrates becomes large, so that there is a fear that variation in the fluttering characteristic also becomes large. Even if the heating temperature during homogenization treatment is higher than 620° C., there is a fear that the aluminum alloy ingot melts. Even if the heating time for homogenization treatment is longer than 60 hours, the effect of the treatment is saturated and it is impossible to obtain more noticeable improvement effects.

Next, the DC-cast aluminum alloy ingot, which has been subjected to homogenization treatment as needed or not subjected to homogenization treatment, is formed into a plate by the hot-rolling step (step S104 in (a) of FIG. 1). When performing hot rolling, conditions therefor are not specifically limited, but the hot rolling start temperature is preferably set to 250 to 600° C. and the the hot rolling end temperature is preferably set to 230 to 450° C.

Next, a rolled plate formed by hot-rolling the ingot cast by DC casting as described above or a cast plate cast by the CC casting method is cold-rolled into an aluminum alloy sheet having a thickness of about 1.8 mm to 0.35 mm (step S105). Cold rolling finishes the rolled plate into a sheet having a desired product thickness. The reduction ratio of cold rolling is not particularly limited, but is only required to be determined according to the required product strength and thickness of the aluminum sheet alloy, and the reduction ratio is preferably set to 10 to 95%. Before cold rolling or in the middle of cold rolling, annealing may be performed to secure cold rolling workability. In the case of carrying out the annealing treatment, for example, for batch type heating, it is preferable to carry out the same under the conditions of holding at 300 to 500° C. for 0.1 to 30 hours, whereas, for continuous type heating, it is preferable to carry out the same under the conditions of holding at 400 to 600° C. for 0 to 60 seconds. Here, the holding time of 0 seconds means that cooling is immediately executed upon reaching a desired holding temperature.

C. Aluminum Alloy Substrate for Magnetic Disk According to the Present Disclosure Next, using the aluminum alloy sheet made in the step 6, by producing a disk blank (step S107) and performing pressure planarization treatment (step S108), an aluminum alloy substrate for a magnetic disk (hereinafter, referred to as "aluminum alloy substrate") is made (step S109). First, the aluminum alloy sheet is punched into an annular shape to form a disk blank (step S107), Next, the disk blank is pressure annealed in the atmosphere, for example, at 100° C. or higher and 350° C. or lower for 30 minutes or longer, to thereby form a flattened blank (step S108). Next, the blank is subjected to lathing and grinding, and preferably to heat treatment for strain removal at a temperature of 250 to 400° C. for 5 to 15 minutes, in this order, to thereby make an aluminum alloy substrate (step S109). The aluminum alloy substrate is obtained by the above-described steps.

D. Aluminum Alloy Base Disk for Magnetic Disk According to the Present Disclosure Next, after the surface of the aluminum alloy substrate obtained at the step 9 is subjected to degreasing treatment, acid etching treatment, and desmutting treatment, the surface was subjected to zincate treatment (Zn substitution treatment) (step S110). Further, the surface of the aluminum alloy substrate subjected to the zincate treatment is subjected to Ni—P plating as undercoat treatment (step S111). Thus, the aluminum alloy base disk is made (step S111).

D. Aluminum alloy base disk for magnetic disk according to the present disclosure Next, after the surface of the aluminum alloy substrate obtained at the step 9 is subjected to degreasing treatment, acid etching treatment, and desmutting treatment, the surface was subjected to zincate treatment (Zn substitution treatment) (step S110). Further, the surface of the aluminum alloy substrate subjected to the zincate treatment is subjected to Ni—P plating as undercoat treatment (step S111). Thus, the aluminum alloy base disk is made (step S112).

It is preferable that degreasing treatment is performed by using a commercially available degreasing solution of AD-68F (made by C. Uyemura & Co., Ltd.), under the conditions of a temperature of 40 to 70° C., a treatment time of 3 to 10 minutes, and a concentration of 200 to 800 mL/L. Acid etching treatment is performed by using a commercially available degreasing solution of AD-107F (made by C. Uyemura & Co., Ltd.), under the conditions of a temperature of 50 to 75° C., a treatment time of 0.5 to 5 minutes, and a concentration of 20 to 100 mL/L. After the acid etching treatment, usual desmutting treatment is preferably performed using $HNO_3$ under the conditions of a temperature of 15 to 40° C., a treatment time of 10 to 120 seconds, and a concentration of 10 to 60%.

1st zincate treatment is performed by using a commercially available zincate treatment solution of AD-301F-3X (made by C. Uyemura & Co., Ltd.), under the conditions of a temperature of 10 to 35° C., a treatment time of 0.1 to 5 minutes, and a concentration of 100 to 500 mL/L. After the 1st zincate treatment, it is preferable to perform Zn peeling treatment using $HNO_3$ under conditions of a temperature of 15 to 40° C., a treatment time of 10 to 120 seconds, and a concentration of 10 to 60%. Thereafter, 2nd zincate treatment is carried out under the same conditions as the 1st zincate treatment.

An electroless Ni—P plating step is performed as undercoat plating treatment on the surface of the 2nd zincate-treated aluminum alloy substrate (S111). Electroless Ni—P plating is preferably performed using a commercially available plating solution of Nimden HDX (made by C. Uyemura & Co., Ltd.) or the like, under conditions of a temperature of 80 to 95° C., a treatment time of 30 to 180 minutes, a Ni concentration of 3 to 10 g/L. Through the electroless Ni—P plating step, an aluminum alloy base disk subjected to the undercoat plating treatment is obtained (step S112).

E. Magnetic Disk

Finally, a magnetic disk is made by performing a step (step S113) in which the surface of the aluminum alloy base disk for a magnetic disk, which has been subjected to the undercoat plating treatment, is smoothed by polishing, and a magnetic medium including an undercoat layer, a magnetic layer, a protective film, a lubricant layer, and the like is deposited on the surface by sputtering.

Note that after the aluminum alloy sheet is made in the step S106 after the cold rolling step (step S105), the types and distribution of intermetallic compounds forming the second phase particles hardly change. Therefore, in place of the aluminum alloy sheet made in the step S106, the aluminum alloy substrate made in the step S109 after the pressure planarization treatment step (step S108) or the aluminum alloy base disk made in the step S112 after the Ni—P plating step (S111), or the magnetic disk after the step of depositing the magnetic substance (step S113) may be used to evaluate the intermetallic compounds forming the second phase particles.

F. Fluttering Characteristic

The fluttering characteristic is affected also by the motor characteristics of a hard disk drive. In the present disclosure, the fluttering characteristic in air is preferably 30 nm or less, more preferably, 10 nm or less. When 30 nm or less, it is judged that the magnetic disk can withstand the use for general HDDs. When the fluttering characteristic in air is more than 30 nm, the positioning error of the head as a reader increases.

Here, since the necessary fluttering characteristic differs depending on the hard disk drive used, the distribution state of the second phase particles may be determined as appropriate for the necessary fluttering characteristics. These can be obtained by appropriately adjusting the contents of additive elements described above, the casting method including addition of a refiner at the time of casting, and the heat history and work history by the subsequent heat treatment and working.

Note that the fluid force can be lowered by filling the hard disk with helium. This is because the gas viscosity of helium is as low as about ⅛ of that of air. Fluttering caused by the gas flow accompanying the rotation of the hard disk is reduced by reducing the fluid force of gas.

[Embodiments]

Hereafter, the present invention will be described in more detail with reference to Examples, which should not be construed as limiting the scope of the invention.

Each of alloy materials having respective compositions shown in Tables 1 to 3 was melted in accordance with a conventional method to prepare a molten aluminum alloy (step S101). In Tables 1 to 3, "–" indicates less than the measurement limit.

TABLE 1

| ALLOY No. | ALLOY COMPOSITION (mass %) | | | | | | | | | | | | | Al + UNAVOIDABLE IMPURITIES |
|---|---|---|---|---|---|---|---|---|---|---|---|---|---|---|
| | Fe | Mn | Cu | Zn | Si | Ni | Mg | Cr | Zr | Ti | B | V | Ti + B + V | |
| A1 | 0.10 | — | 0.020 | 0.230 | — | — | — | — | — | 0.005 | — | — | 0.005 | Bal. |
| A2 | 0.40 | — | 0.020 | 0.230 | — | — | — | — | — | 0.005 | — | 0.002 | 0.007 | Bal. |
| A3 | 0.60 | — | 0.020 | 0.230 | 0.2 | — | — | — | — | 0.010 | — | 0.005 | 0.015 | Bal. |
| A4 | 0.80 | — | 0.020 | 0.230 | — | 0.2 | — | — | — | 0.015 | — | 0.005 | 0.020 | Bal. |
| A5 | 1.00 | — | 0.020 | 0.230 | — | — | — | — | — | 0.015 | — | 0.005 | 0.020 | Bal. |
| A6 | 1.20 | — | 0.020 | 0.230 | — | — | 0.2 | — | — | 0.010 | — | 0.005 | 0.015 | Bal. |
| A7 | 1.50 | — | 0.020 | 0.230 | — | — | — | 0.20 | — | 0.015 | — | 0.005 | 0.020 | Bal. |
| A8 | 1.80 | — | 0.020 | 0.230 | — | — | — | — | 0.20 | 0.015 | — | 0.005 | 0.020 | Bal. |
| A9 | 2.00 | — | 0.020 | 0.230 | — | — | — | — | — | 0.015 | — | 0.005 | 0.020 | Bal. |
| A10 | 2.90 | — | 0.020 | 0.230 | — | — | — | — | — | 0.060 | 0.001 | 0.020 | 0.081 | Bal. |
| A11 | 1.50 | 0.1 | 0.020 | 0.230 | — | — | — | — | — | 0.002 | 0.001 | 0.005 | 0.008 | Bal. |
| A12 | 1.50 | 0.3 | 0.020 | 0.230 | — | — | — | — | — | 0.015 | — | 0.005 | 0.020 | Bal. |
| A13 | 1.50 | 1.5 | 0.020 | 0.230 | — | — | — | — | — | 0.015 | — | 0.005 | 0.020 | Bal. |
| A14 | 1.50 | 2.9 | 0.020 | 0.230 | — | — | — | — | — | 0.015 | — | 0.005 | 0.020 | Bal. |
| A15 | 1.50 | — | 0.020 | 0.230 | 0.1 | — | — | — | — | 0.010 | — | 0.005 | 0.015 | Bal. |
| A16 | 1.50 | — | 0.020 | 0.230 | 0.4 | — | — | — | — | 0.015 | — | 0.005 | 0.020 | Bal. |
| A17 | 1.50 | — | 0.020 | 0.230 | 4.5 | — | — | — | — | 0.015 | — | 0.005 | 0.020 | Bal. |
| A18 | 1.50 | — | 0.020 | 0.230 | — | 0.1 | — | — | — | 0.015 | — | 0.005 | 0.020 | Bal. |
| A19 | 1.50 | — | 0.020 | 0.230 | — | 3.0 | — | — | — | 0.010 | — | 0.005 | 0.015 | Bal. |
| A20 | 1.50 | — | 0.020 | 0.230 | — | 7.9 | — | — | — | 0.015 | — | 0.005 | 0.020 | Bal. |
| A21 | 1.50 | — | 0.003 | 0.230 | — | — | — | — | — | 0.010 | — | 0.005 | 0.015 | Bal. |
| A22 | 1.50 | — | 0.021 | 0.230 | — | — | — | — | — | 0.010 | — | 0.005 | 0.015 | Bal. |
| A23 | 1.50 | — | 0.151 | 0.230 | — | — | — | — | — | 0.010 | — | 0.005 | 0.015 | Bal. |
| A24 | 1.50 | — | 0.932 | 0.230 | — | — | — | — | — | 0.010 | — | 0.005 | 0.015 | Bal. |
| A25 | 1.50 | — | 0.020 | 0.230 | — | — | 0.1 | — | — | 0.015 | — | 0.005 | 0.020 | Bal. |
| A26 | 1.50 | — | 0.020 | 0.230 | — | — | 0.9 | — | — | 0.010 | — | 0.005 | 0.015 | Bal. |
| A27 | 0.40 | — | 0.020 | 0.230 | — | — | 6.0 | — | — | 0.015 | — | 0.005 | 0.020 | Bal. |
| A28 | 1.50 | — | 0.020 | 0.230 | — | — | — | 0.01 | — | 0.015 | — | 0.005 | 0.020 | Bal. |
| A29 | 1.50 | — | 0.020 | 0.230 | — | — | — | 0.15 | — | 0.010 | — | 0.005 | 0.015 | Bal. |
| A30 | 1.50 | — | 0.020 | 0.230 | — | — | — | 0.95 | — | 0.015 | — | 0.005 | 0.020 | Bal. |

TABLE 2

| ALLOY No. | Fe | Mn | Cu | Zn | Si | Ni | Mg | Cr | Zr | Ti | B | V | Ti + B + V | Al + UNAVOIDABLE IMPURITIES |
|---|---|---|---|---|---|---|---|---|---|---|---|---|---|---|
| A31 | 1.50 | — | 0.020 | 0.230 | — | — | — | — | 0.01 | 0.015 | — | 0.005 | 0.020 | Bal. |
| A32 | 1.50 | — | 0.020 | 0.230 | — | — | — | — | 0.15 | 0.015 | — | 0.005 | 0.020 | Bal. |
| A33 | 1.50 | — | 0.020 | 0.230 | — | — | — | — | 0.95 | 0.015 | — | 0.005 | 0.020 | Bal. |
| A34 | 1.50 | — | 0.020 | 0.005 | — | — | — | — | — | 0.052 | — | 0.005 | 0.057 | Bal. |
| A35 | 1.50 | — | 0.020 | 0.350 | — | — | — | — | — | 0.015 | — | 0.020 | 0.035 | Bal. |
| A36 | 1.50 | — | 0.020 | 0.950 | — | — | — | — | — | 0.052 | 0.005 | — | 0.057 | Bal. |
| A37 | 0.80 | 0.1 | 0.020 | 0.230 | 0.1 | 0.1 | 0.3 | 0.15 | 0.15 | 0.006 | 0.001 | 0.001 | 0.008 | Bal. |
| A38 | 1.50 | 0.1 | 0.020 | 0.230 | 0.1 | 0.1 | 0.3 | 0.15 | 0.15 | 0.072 | 0.001 | 0.021 | 0.094 | Bal. |
| A39 | 2.30 | 0.1 | 0.020 | 0.230 | 0.1 | 0.1 | 0.3 | 0.15 | 0.15 | 0.433 | 0.021 | 0.010 | 0.464 | Bal. |
| A40 | 1.50 | — | 0.020 | 0.230 | — | — | — | — | — | 0.015 | — | 0.005 | 0.020 | Bal. |
| A41 | 1.50 | — | 0.020 | 0.230 | — | — | — | — | — | 0.015 | — | 0.005 | 0.020 | Bal. |
| A42 | 1.50 | — | 0.020 | 0.230 | — | — | — | — | — | 0.015 | — | 0.005 | 0.020 | Bal. |
| A43 | 1.50 | 0.1 | 0.020 | 0.230 | 0.1 | — | — | — | — | 0.015 | — | 0.005 | 0.020 | Bal. |
| A44 | 1.50 | — | 0.020 | 0.230 | — | 0.1 | 0.3 | — | — | 0.015 | — | 0.005 | 0.020 | Bal. |
| A45 | 1.50 | — | 0.020 | 0.230 | — | — | — | 0.15 | 0.15 | 0.015 | — | 0.005 | 0.020 | Bal. |
| A46 | 0.60 | — | 0.020 | 0.230 | — | — | — | — | — | 0.015 | — | 0.005 | 0.020 | Bal. |
| A47 | 2.00 | — | 0.020 | 0.230 | — | — | — | — | — | 0.015 | — | 0.005 | 0.020 | Bal. |

TABLE 3

| ALLOY No. | Fe | Mn | Cu | Zn | Si | Ni | Mg | Cr | Zr | Ti | B | V | Ti + B +V | Al + UNAVOIDABLE IMPURITIES |
|---|---|---|---|---|---|---|---|---|---|---|---|---|---|---|
| AC1 | 0.03 | — | 0.020 | 0.023 | — | — | — | — | — | 0.010 | — | 0.005 | 0.015 | Bal. |
| AC2 | 0.04 | — | 0.020 | 0.230 | — | — | — | — | — | 0.010 | — | 0.005 | 0.015 | Bal. |
| AC3 | 3.50 | — | 0.020 | 0.230 | — | — | — | — | — | 0.010 | — | 0.005 | 0.015 | Bal. |
| AC4 | 1.50 | 3.5 | 0.020 | 0.230 | — | — | — | — | — | 0.010 | — | 0.005 | 0.015 | Bal. |
| AC5 | 1.50 | — | — | 0.230 | — | — | — | — | — | 0.010 | — | 0.005 | 0.015 | Bal. |
| AC6 | 1.50 | — | 1.520 | 0.230 | — | — | — | — | — | 0.010 | — | 0.005 | 0.015 | Bal. |
| AC7 | 1.50 | — | 0.020 | — | — | — | — | — | — | 0.010 | — | 0.005 | 0.015 | Bal. |
| AC8 | 1.50 | — | 0.020 | 1.520 | — | — | — | — | — | 0.010 | — | 0.005 | 0.015 | Bal. |
| AC9 | 1.50 | — | 0.020 | 0.230 | 6.0 | — | — | — | — | 0.010 | — | 0.005 | 0.015 | Bal. |
| AC10 | 1.50 | — | 0.020 | 0.230 | — | 9.0 | — | — | — | 0.010 | — | 0.005 | 0.015 | Bal. |
| AC11 | 1.50 | — | 0.020 | 0.230 | — | — | 7.2 | — | — | 0.010 | — | 0.005 | 0.015 | Bal. |
| AC12 | 1.50 | — | 0.020 | 0.230 | — | — | — | 1.40 | — | 0.010 | — | 0.005 | 0.015 | Bal. |
| AC13 | 1.50 | — | 0.020 | 0.230 | — | — | — | — | 1.40 | 0.010 | — | 0.005 | 0.015 | Bal. |
| AC14 | 1.50 | — | 0.020 | 0.230 | — | — | — | — | — | — | — | — | 0.000 | Bal. |
| AC15 | 1.50 | — | 0.020 | 0.230 | — | — | — | — | — | 0.010 | — | 0.005 | 0.015 | Bal. |
| AC16 | 1.50 | — | 0.020 | 0.230 | — | — | — | — | — | 0.010 | — | 0.005 | 0.015 | Bal. |
| AC17 | 1.50 | — | 0.020 | 0.230 | — | — | — | — | — | 0.420 | — | 0.005 | 0.425 | Bal. |
| AC18 | 1.50 | — | 0.020 | 0.230 | — | — | — | — | — | 0.432 | — | 0.005 | 0.437 | Bal. |
| AC19 | 1.50 | — | 0.020 | 0.230 | — | — | — | — | — | 0.010 | — | 0.005 | 0.015 | Bal. |
| AC20 | 1.50 | — | 0.020 | 0.230 | — | — | — | — | — | 0.010 | — | 0.005 | 0.015 | Bal. |
| AC21 | 1.50 | — | 0.020 | 0.230 | — | — | — | — | — | 0.231 | — | 0.005 | 0.236 | Bal. |
| AC22 | 1.50 | — | 0.020 | 0.230 | — | — | — | — | — | 0.312 | — | 0.005 | 0.317 | Bal. |

Next, as for alloy Nos. A40 to 47, AC5, and AC19 to AC22, molten aluminum alloy was cast by the DC method to make an ingot having a thickness of 80 mm, and opposite sides thereof were face-cut to a depth of 10 mm (step S102 in (a) of FIG. 1). Except Nos. A40 to 47, AC5, and AC19 to AC22, the molten aluminum alloy was cast by the CC method to produce a cast plate having a thickness of 5 mm (step S102 in (b) of FIG. 1). For No. AC14, no refiner was added, but except No. AC14, an Al—Ti—C-based refiner was used, and casting was performed under the conditions shown in Tables 4 to 6.

TABLE 4

| | ALLOY No. | TIME TO ELAPSE AFTER ADDING REFINER TO MOLTEN METAL UNTIL CASTING (MINUTES) |
|---|---|---|
| EXAMPLE 1 | A1 | 2 |
| EXAMPLE 2 | A2 | 5 |

TABLE 4-continued

| | ALLOY No. | TIME TO ELAPSE AFTER ADDING REFINER TO MOLTEN METAL UNTIL CASTING (MINUTES) |
|---|---|---|
| EXAMPLE 3 | A3 | 10 |
| EXAMPLE 4 | A4 | 30 |
| EXAMPLE 5 | A5 | 55 |
| EXAMPLE 6 | A6 | 7 |
| EXAMPLE 7 | A7 | 7 |
| EXAMPLE 8 | A8 | 7 |
| EXAMPLE 9 | A9 | 7 |
| EXAMPLE 10 | A10 | 7 |
| EXAMPLE 11 | A11 | 7 |
| EXAMPLE 12 | A12 | 7 |
| EXAMPLE 13 | A13 | 7 |
| EXAMPLE 14 | A14 | 7 |
| EXAMPLE 15 | A15 | 7 |
| EXAMPLE 16 | A16 | 7 |

TABLE 4-continued

| | ALLOY No. | TIME TO ELAPSE AFTER ADDING REFINER TO MOLTEN METAL UNTIL CASTING (MINUTES) |
|---|---|---|
| EXAMPLE 17 | A17 | 7 |
| EXAMPLE 18 | A18 | 7 |
| EXAMPLE 19 | A19 | 7 |
| EXAMPLE 20 | A20 | 7 |
| EXAMPLE 21 | A21 | 7 |
| EXAMPLE 22 | A22 | 7 |
| EXAMPLE 23 | A23 | 7 |
| EXAMPLE 24 | A24 | 7 |
| EXAMPLE 25 | A25 | 7 |
| EXAMPLE 26 | A26 | 7 |
| EXAMPLE 27 | A27 | 7 |
| EXAMPLE 28 | A28 | 7 |
| EXAMPLE 29 | A29 | 7 |
| EXAMPLE 30 | A30 | 7 |

TABLE 5

| | ALLOY No. | TIME TO ELAPSE AFTER ADDING REFINER TO MOLTEN METAL UNTIL CASTING (MINUTES) |
|---|---|---|
| EXAMPLE 31 | A31 | 7 |
| EXAMPLE 32 | A32 | 7 |
| EXAMPLE 33 | A33 | 7 |
| EXAMPLE 34 | A34 | 7 |
| EXAMPLE 35 | A35 | 7 |
| EXAMPLE 36 | A36 | 7 |
| EXAMPLE 37 | A37 | 7 |
| EXAMPLE 38 | A38 | 7 |
| EXAMPLE 39 | A39 | 7 |
| EXAMPLE 40 | A40 | 7 |
| EXAMPLE 41 | A41 | 7 |
| EXAMPLE 42 | A42 | 7 |
| EXAMPLE 43 | A43 | 2 |
| EXAMPLE 44 | A44 | 30 |
| EXAMPLE 45 | A45 | 55 |
| EXAMPLE 46 | A46 | 7 |
| EXAMPLE 47 | A47 | 7 |

TABLE 6

| | ALLOY No. | TIME TO ELAPSE AFTER ADDING REFINER TO MOLTEN METAL UNTIL CASTING (MINUTES) |
|---|---|---|
| COMPARATIVE EXAMPLE 1 | AC1 | 7 |
| COMPARATIVE EXAMPLE 2 | AC2 | 7 |
| COMPARATIVE EXAMPLE 3 | AC3 | 7 |
| COMPARATIVE EXAMPLE 4 | AC4 | 7 |
| COMPARATIVE EXAMPLE 5 | AC5 | 7 |
| COMPARATIVE EXAMPLE 6 | AC6 | 7 |
| COMPARATIVE EXAMPLE 7 | AC7 | 7 |
| COMPARATIVE EXAMPLE 8 | AC8 | 7 |
| COMPARATIVE EXAMPLE 9 | AC9 | 7 |
| COMPARATIVE EXAMPLE 10 | AC10 | 7 |
| COMPARATIVE EXAMPLE 11 | AC11 | 7 |
| COMPARATIVE EXAMPLE 12 | AC12 | 7 |
| COMPARATIVE EXAMPLE 13 | AC13 | 7 |
| COMPARATIVE EXAMPLE 14 | AC14 | — |
| COMPARATIVE EXAMPLE 15 | AC15 | 0.2 |
| COMPARATIVE EXAMPLE 16 | AC16 | 0.3 |
| COMPARATIVE EXAMPLE 17 | AC17 | 70 |
| COMPARATIVE EXAMPLE 18 | AC18 | 80 |
| COMPARATIVE EXAMPLE 19 | AC19 | 0.2 |
| COMPARATIVE EXAMPLE 20 | AC20 | 0.3 |
| COMPARATIVE EXAMPLE 21 | AC21 | 70 |
| COMPARATIVE EXAMPLE 22 | AC22 | 80 |

Next, for Nos. A40 to 47, AC5, and AC19 to AC22, homogenization heat treatment was performed at 380° C. for two hours (step S103 in (a) of FIG. 1). Next, for Nos. A40 to 47, AC5, and AC19 to AC22, hot rolling was performed by setting the hot rolling start temperature to 380° C. and the hot rolling end temperature to 300° C. to thereby form a hot-rolled plate having a thickness of 3 mm (step S104 in (a) of FIG. 1).

Next, annealing (batch type) was performed at 360° C. for two hours, after hot rolling for the alloys of Nos. A40 and A41, and after CC casting for the alloy of AC7. The hot-rolled plate and the CC cast plate, thus made, were rolled by cold rolling to a final thickness of 0.8 mm to form an aluminum alloy sheet (step S106). From the thus made aluminum alloy sheets, annular sheets having an outer diameter of 96 mm and an inner diameter of 24 mm were punched to make disk blanks (step S107).

The blank disks made as described above were subjected to pressure planarization treatment at 300° C. under a pressure of 0.2 MPa for three hours (step S108). Then, end face working (lathing) was performed on disk blanks subjected to pressure planarization treatment to obtain an outer diameter of 95 mm and an inner diameter of 25 mm, and grinding (surface 10 μm grinding) was performed to make an aluminum alloy substrate (step S109). Then, after degreasing at 60° C. for 5 minutes with AD-68F (trade name, made by C. Uyemura & Co., Ltd.), acid etching was performed at 65° C. for one minute with AD-107F (trade name, made by C. Uyemura & Co., Ltd.), and further desmutting treatment was performed with 30% aqueous HNO$_3$ (room temperature) for 20 seconds (step S110).

After the surface condition was adjusted as described above, the disk blank was immersed in a 20° C. zincate treatment solution of AD-301F-3X (trade name, made by C. Uyemura & Co., Ltd.) for 0.5 minutes to subject the surface to zincate treatment (step S110). Note that the zincate treatment was executed twice in total, and the surface was peeled off by dipping in a 30% aqueous HNO$_3$ solution at room temperature for 20 seconds between the executions of the zincate treatment. After the zincate-treated surface was electrolessly plated with Ni—P to a thickness of 10.0 μm using an electroless Ni—P plating solution (Nimden HDX (trade name, made by C. Uyemura & Co., Ltd.)) (step S111), finish polishing was performed using a feather cloth (1.5 μm polishing amount) (S111). Thus, the aluminum alloy base disk was made (step S112).

The following evaluation was performed on specimens of the aluminum alloy sheet (step S106) after the cold rolling (step S105) or the aluminum alloy base disk (step S112) after the plating treatment polishing (step S111). Further, for each specimen, three disks made under the same conditions were subjected up to the plating treatment, but all the three disks of each of Comparative Examples 3 to 13, 17, 18, 21, and 22 suffered from plating peeling. Therefore, for these Comparative Examples, the evaluation of the fluttering characteristic could not be performed.

[Area Ratio of Second Phase Particles]

After the cross-sectional surface of an aluminum alloy sheet (step S106) after the cold rolling (step S105) was polished, a field of view of 1.0 mm² was observed at a magnification of 300 times by SEM in each of the region (A) and the region (B), and the area ratios of second phase particles in the regions (A) and (B) were calculated using a particle analysis software "AZO-KUN" (tradename manufactured by Asahi Kasei Engineering Corporation). The area ratios of second phase particles in the regions (A) and (B) were determined by calculating areas of second phase particles which were different in contrast from the matrix, from COMPO images photographed in the regions (A) and (B), and dividing each area by the area (1.0 mm²) of the whole field of view photographed in each of the region (A) or (B). In the COMPO image of SEM, Al—Fe-based intermetallic compounds and the like of second phase particles appear as an image of contrast more white than the matrix, whereas Mg—Si-based intermetallic compounds and the like appear as an image of contrast more black than the matrix. Observation was performed on an L-ST cross-section (cross-section defined by a rolling direction and a thickness direction).

[Distribution Density of Ti-Based Compound Particles Having Circle-Equivalent Diameters of 15 to 50 μm]

The surface of the aluminum alloy sheet (step S106) after cold rolling (step S105) was polished to a depth of 10 μm and photographed at a magnification of 300 times by EPMA, and at the same time subjected to component analysis of compounds, to thereby calculate a distribution density of Ti-based compound particles having circle-equivalent diameters of 15 to 50 μm. Note that the photographing was performed on a plurality of photographing fields of view amounting to a total of 1.0 mm², and the numbers of particles in the areas were added up to calculate a total as a distribution density.

TABLE 7

| | ALLOY NO. | AREA RATIO OF SECOND PHASE PARTICLES IN REGION A (%) | AREA RATIO OF SECOND PHASE PARTICLES IN REGION B (%) | (DIFFERENCE IN AREA RATIO BETWEEN REGIONS A AND B)/ (ARITHMETIC MEAN VALUE OF AREA RATIOS OF REGIONS A AND B) | FLUTTERING CHARACTERISTIC | DISTRIBUTION DENSITY OF Ti-BASE COMPOUND PARTICLES HAVING CIRCLE-EQUIVALENT DIAMETERS OF 15 TO 50 μm |
|---|---|---|---|---|---|---|
| EXAMPLE 1 | A1 | 0.9 | 0.7 | 0.25 | C | 0 |
| EXAMPLE 2 | A2 | 1.8 | 2.7 | 0.40 | A | 0 |
| EXAMPLE 3 | A3 | 4.4 | 4.9 | 0.11 | A | 0 |
| EXAMPLE 4 | A4 | 5.3 | 8.2 | 0.43 | A | 0 |
| EXAMPLE 5 | A5 | 6.2 | 5.6 | 0.11 | A | 0 |
| EXAMPLE 6 | A6 | 9.8 | 6.0 | 0.48 | A | 0 |
| EXAMPLE 7 | A7 | 8.9 | 9.8 | 0.10 | A | 0 |
| EXAMPLE 8 | A8 | 12.3 | 11.3 | 0.08 | A | 0 |
| EXAMPLE 9 | A9 | 17.2 | 15.3 | 0.12 | A | 0 |
| EXAMPLE 10 | A10 | 18.7 | 18.5 | 0.01 | A | 0 |
| EXAMPLE 11 | A11 | 6.0 | 7.2 | 0.18 | A | 0 |
| EXAMPLE 12 | A12 | 5.3 | 8.0 | 0.41 | A | 0 |
| EXAMPLE 13 | A13 | 16.9 | 18.2 | 0.07 | A | 0 |
| EXAMPLE 14 | A14 | 24.3 | 20.1 | 0.19 | A | 0 |
| EXAMPLE 15 | A15 | 4.4 | 6.5 | 0.39 | A | 0 |
| EXAMPLE 16 | A16 | 10.7 | 10.3 | 0.03 | A | 0 |
| EXAMPLE 17 | A17 | 14.0 | 15.6 | 0.11 | A | 0 |
| EXAMPLE 18 | A18 | 8.9 | 10.8 | 0.19 | A | 0 |
| EXAMPLE 19 | A19 | 9.8 | 14.3 | 0.37 | A | 0 |
| EXAMPLE 20 | A20 | 29.3 | 25.8 | 0.13 | A | 0 |
| EXAMPLE 21 | A21 | 8.0 | 9.8 | 0.20 | A | 0 |
| EXAMPLE 22 | A22 | 9.8 | 13.4 | 0.31 | A | 0 |
| EXAMPLE 23 | A23 | 10.7 | 10.5 | 0.02 | A | 0 |
| EXAMPLE 24 | A24 | 12.4 | 16.9 | 0.31 | A | 0 |
| EXAMPLE 25 | A25 | 6.2 | 8.6 | 0.32 | A | 0 |
| EXAMPLE 26 | A26 | 7.1 | 10.3 | 0.37 | A | 0 |
| EXAMPLE 27 | A27 | 13.3 | 15.0 | 0.12 | B | 0 |
| EXAMPLE 28 | A28 | 9.3 | 12.0 | 0.25 | A | 0 |
| EXAMPLE 29 | A29 | 9.5 | 13.1 | 0.32 | A | 0 |
| EXAMPLE 30 | A30 | 11.5 | 13.0 | 0.12 | A | 0 |

TABLE 8

| ALLOY NO. | AREA RATIO OF SECOND PHASE PARTICLES IN REGION A (%) | AREA RATIO OF SECOND PHASE PARTICLES IN REGION B (%) | (DIFFERENCE IN AREA RATIO BETWEEN REGIONS A AND B)/ (ARITHMETIC MEAN VALUE OF AREA RATIOS OF REGIONS A AND B) | FLUTTERING CHARAC- TERISTIC | DISTRIBUTION DENSITY OF Ti-BASE COMPOUND PARTICLES HAVING CIRCLE-EQUIVALENT DIAMETERS OF 15 TO 50 μm |
|---|---|---|---|---|---|
| EXAMPLE 31 | A31 | 10.3 | 9.2 | 0.11 | A | 0 |
| EXAMPLE 32 | A32 | 10.5 | 9.3 | 0.12 | A | 0 |
| EXAMPLE 33 | A33 | 18.2 | 16.9 | 0.07 | A | 0 |
| EXAMPLE 34 | A34 | 10.4 | 9.3 | 0.11 | A | 0 |
| EXAMPLE 35 | A35 | 8.9 | 10.6 | 0.17 | A | 0 |
| EXAMPLE 36 | A36 | 8.8 | 8.9 | 0.01 | A | 0 |
| EXAMPLE 37 | A37 | 8.9 | 9.8 | 0.10 | A | 0 |
| EXAMPLE 38 | A38 | 12.3 | 12.4 | 0.01 | A | 0 |
| EXAMPLE 39 | A39 | 17.2 | 15.3 | 0.12 | A | 1 |
| EXAMPLE 40 | A40 | 9.2 | 10.5 | 0.13 | A | 0 |
| EXAMPLE 41 | A41 | 8.8 | 9.3 | 0.06 | A | 0 |
| EXAMPLE 42 | A42 | 9.6 | 8.5 | 0.12 | A | 0 |
| EXAMPLE 43 | A43 | 8.2 | 10.5 | 0.25 | A | 0 |
| EXAMPLE 44 | A44 | 9.6 | 8.7 | 0.10 | A | 0 |
| EXAMPLE 45 | A45 | 8.8 | 9.5 | 0.08 | A | 0 |
| EXAMPLE 46 | A46 | 4.3 | 4.8 | 0.11 | A | 0 |
| EXAMPLE 47 | A47 | 17.1 | 14.9 | 0.14 | A | 0 |

TABLE 9

| | ALLOY NO. | AREA RATIO OF SECOND PHASE PARTICLES IN REGION A (%) | AREA RATIO OF SECOND PHASE PARTICLES IN REGION B (%) | (DIFFERENCE IN AREA RATIO BETWEEN REGIONS A AND B)/ (ARITHMETIC MEAN VALUE OF AREA RATIOS OF REGIONS A AND B) | FLUTTERING CHARAC- TERISTIC | DISTRIBUTION DENSITY OF Ti-BASE COMPOUND PARTICLES HAVING CIRCLE-EQUIVALENT DIAMETERS OF 15 TO 50 μm |
|---|---|---|---|---|---|---|
| COMPARATIVE EXAMPLE 1 | AC1 | 0.3 | 0.2 | 0.40 | D | 0 |
| COMPARATIVE EXAMPLE 2 | AC2 | 0.3 | 0.4 | 0.29 | D | 0 |
| COMPARATIVE EXAMPLE 3 | AC3 | 28.3 | 25.5 | 0.10 | — | 0 |
| COMPARATIVE EXAMPLE 4 | AC4 | 27.5 | 25.1 | 0.09 | — | 0 |
| COMPARATIVE EXAMPLE 5 | AC5 | 11.0 | 8.9 | 0.21 | — | 0 |
| COMPARATIVE EXAMPLE 6 | AC6 | 18.0 | 17.3 | 0.04 | — | 0 |
| COMPARATIVE EXAMPLE 7 | AC7 | 10.5 | 8.9 | 0.16 | — | 0 |
| COMPARATIVE EXAMPLE 8 | AC8 | 13.0 | 15.2 | 0.16 | — | 0 |
| COMPARATIVE EXAMPLE 9 | AC9 | 17.8 | 15.9 | 0.11 | — | 0 |
| COMPARATIVE EXAMPLE 10 | AC10 | 31.3 | 29.3 | 0.07 | — | 0 |
| COMPARATIVE EXAMPLE 11 | AC11 | 17.0 | 15.9 | 0.07 | — | 0 |
| COMPARATIVE EXAMPLE 12 | AC12 | 19.0 | 18.0 | 0.05 | — | 0 |
| COMPARATIVE EXAMPLE 13 | AC13 | 20.0 | 21.0 | 0.05 | — | 0 |
| COMPARATIVE EXAMPLE 14 | AC14 | 14.0 | 5.9 | 0.81 | D | 0 |
| COMPARATIVE EXAMPLE 15 | AC15 | 13.2 | 6.8 | 0.64 | D | 0 |
| COMPARATIVE EXAMPLE 16 | AC16 | 12.9 | 6.9 | 0.61 | D | 0 |
| COMPARATIVE EXAMPLE 17 | AC17 | 9.6 | 8.9 | 0.08 | — | 14 |
| COMPARATIVE EXAMPLE 18 | AC18 | 8.8 | 9.3 | 0.06 | — | 19 |

TABLE 9-continued

| | ALLOY NO. | AREA RATIO OF SECOND PHASE PARTICLES IN REGION A (%) | AREA RATIO OF SECOND PHASE PARTICLES IN REGION B (%) | (DIFFERENCE IN AREA RATIO BETWEEN REGIONS A AND B)/ (ARITHMETIC MEAN VALUE OF AREA RATIOS OF REGIONS A AND B) | FLUTTERING CHARACTERISTIC | DISTRIBUTION DENSITY OF Ti-BASE COMPOUND PARTICLES HAVING CIRCLE-EQUIVALENT DIAMETERS OF 15 TO 50 μm |
|---|---|---|---|---|---|---|
| COMPARATIVE EXAMPLE 19 | AC19 | 11.8 | 6.1 | 0.64 | D | 0 |
| COMPARATIVE EXAMPLE 20 | AC20 | 12.7 | 5.9 | 0.73 | D | 0 |
| COMPARATIVE EXAMPLE 21 | AC21 | 9.4 | 8.9 | 0.05 | — | 10 |
| COMPARATIVE EXAMPLE 22 | AC22 | 8.3 | 9.3 | 0.11 | — | 13 |

[Measurement of Disk Flutter]

Disk flutter was measured using an aluminum alloy base disk after the plating treatment polishing step (step S111). Measurement of disk flutter was performed by placing the aluminum alloy base disk in a commercially available hard disk drive in the presence of air. ST2000 (trade name) made by Seagate Technology was used as the drive, and a motor was driven by directly connecting SLD102 (trade name) made by Techno Alive Co. thereto. The rotational speed of the motor was set to 7200 rpm, and a plurality of disks were always placed for observing vibrations of the surface of each of the disks using LV1800 (trade name), as a laser Doppler meter, made by Ono Sokki Co., Ltd. The observed vibrations were subjected to spectrum analysis using FET analyzer DS3200 (trade name) made by Ono Sokki Co., Ltd. The observation was performed by forming a hole in the cover of the hard disk drive and observing the surface of the disk through the hole. Further, the evaluation was performed by removing a squeeze plate set in the commercially available hard disk.

The fluttering characteristic was evaluated using the maximum displacement (disk fluttering (nm)) of broad peaks in a range of 1500 to 2000 Hz where fluttering appears. Such a broad peak, referred to as non-repeatable run out (NRRO), has been found to have a significant influence on the positioning error of a head. In air, a fluttering characteristic of 10 nm or less was evaluated as A (Excellent), a fluttering characteristic of more than 10 nm and 20 nm or less was evaluated as B (Good), a fluttering characteristic of more than 20 nm and 30 nm or less was evaluated as C (Fair), and a fluttering characteristic of more than 30 nm was evaluated as D "Poor". The results are set forth in Tables 7 to 9

As shown in Tables 7 to 9, Examples 1 to 47 were favorable in the fluttering characteristic. In contrast, Comparative Examples 1 to 22 were poor in the fluttering characteristic, or due to occurrence of plating peeling, the fluttering characteristic could not be evaluated.

Specifically, Comparative Examples 1 and 2 were too low in the content of Fe and accordingly poor in the fluttering characteristic.

Comparative Example 3 was too high in the content of Fe, causing plating peeling, and accordingly the fluttering characteristic could not be evaluated.

Comparative Example 4 was too high in the content of Mn, causing plating peeling, and accordingly the fluttering characteristic could not be evaluated.

Comparative Example 5 had no Cu content, causing plating peeling, and accordingly the fluttering characteristic could not be evaluated.

Comparative Example 6 was too high in the content of Cu, causing plating peeling, and accordingly the fluttering characteristic could not be evaluated.

Comparative Example 7 had no Zn content, causing plating peeling, and accordingly the fluttering characteristic could not be evaluated.

Comparative Example 8 was too high in the content of Zn, causing plating peeling, and accordingly the fluttering characteristic could not be evaluated.

Comparative Example 9 was too high in the content of Si, causing plating peeling, and accordingly the fluttering characteristic could not be evaluated.

Comparative Example 10 was too high in the content of Ni, causing plating peeling, and accordingly the fluttering characteristic could not be evaluated.

Comparative Example 11 was too high in the content of Mg, causing plating peeling, and accordingly the fluttering characteristic could not be evaluated.

Comparative Example 12 was too high in the content of Cr, causing plating peeling, and accordingly the fluttering characteristic could not be evaluated.

Comparative Example 13 was too high in the content of Zr, causing plating peeling, and accordingly the fluttering characteristic could not be evaluated.

For Comparative Example 14, no refiner was added in the molten metal producing step, and hence the value obtained by dividing a difference between area ratios (%) of second phase particles in the regions (A) and (B) by an average value of the area ratios (%) of the regions (A) and (B) was larger than 0.50. As a result, the fluttering characteristic was poor.

For Comparative Examples 15 and 16, the casting step was started less than one minute after adding the refiner to the molten metal in the molten metal producing step, and hence a value obtained by dividing a difference between area ratios (%) of second phase particles in the regions (A) and (B) by an average value of the area ratios (%) of the regions (A) and (B) was larger than 0.50. As a result, the fluttering characteristic was poor.

For Comparative Examples 17 and 18, the casting step was started more than sixty minute after adding the refiner to the molten metal in the molten metal producing step, and hence a large number of Ti-based compound particles were generated to cause occurrence of plating peeling, which made it impossible to evaluate the fluttering characteristic.

Thus, plating peeling occurred and hence it was impossible to use them as the aluminum alloy sheet for a magnetic disk.

For Comparative Examples 19 and 20, the casting step was started less than one minute after adding the refiner to the molten metal in the molten metal producing step, and hence the value obtained by dividing a difference between area ratios (%) of second phase particles in the regions (A) and (B) by an average value of the area ratios (%) of the regions (A) and (B) was larger than 0.50. As a result, the fluttering characteristic was poor.

For Comparative Examples 21 and 22, the casting step was started more than sixty minute after adding the refiner to the molten metal in the molten metal producing step, and hence a large number of coarse Ti-based compound particles were generated to cause occurrence of plating peeling, which made it impossible to evaluate the fluttering characteristic. Thus, plating peeling occurred and hence it was impossible to use them as the aluminum alloy sheet for a magnetic disk.

INDUSTRIAL APPLICABILITY

According to the present disclosure, it is possible to obtain an aluminum alloy sheet for a magnetic disk, which is excellent in the fluttering characteristic of the magnetic disk, and a magnetic disk using the same.

The invention claimed is:

1. An aluminum alloy sheet for a magnetic disk, comprising an aluminum alloy comprising 0.10 to 3.00 mass % of Fe, 0.003 to 1.000 mass % of Cu, 0. 005 to 1.000 mass % of Zn, and one or more elements selected from a group comprising Ti, B, and V, of which a total content is 0.005 to 0.500 mass % with a balance of Al and unavoidable impurities, wherein
- a value obtained by dividing a difference in an area ratio (%) of second phase particles between a region (A) and a region (B) by an average value of area ratios (%) of second phase particles in the regions (A) and (B) is 0.50 or less, the region (A) being a region from a sheet thickness center plane to a front surface of the sheet, and the region (B) being a region from the sheet thickness center plane to a rear surface of the sheet, and
- a distribution density of Ti-based compound particles having circle-equivalent diameters of 15to 50 μm is equal to five/mm$^2$ or less.

2. The aluminum alloy sheet for a magnetic disk, according to claim 1, wherein the aluminum alloy further comprises one or more elements selected from a group comprising 0.1 to 3.0 mass % of Mn, 0.1 to5.0 mass % of Si, 0.1 to 8.0 mass % of Ni, 0.1 to 6.0 mass % of Mg, 0.01 to 1.00 mass % of Cr, and 0.01 to 1.00 mass % of Zr.

3. A magnetic disk wherein an electroless Ni—P plating-treated layer and a magnetic substance layer thereon are provided on a surface of an aluminum alloy substrate comprising the aluminum alloy sheet for a magnetic disk, according claim 1.

4. A method for producing the aluminum alloy sheet for a magnetic disk, according to claim 1, the method comprising a molten metal producing step of producing a molten metal using the aluminum alloy, a semi-continuous casting step of casting an ingot from the produced molten metal by a semi-continuous casting method, a hot rolling step of hot-rolling the ingot, and a cold rolling step of cold-rolling a hot-rolled plate, wherein the semi-continuous casting step is started within one to sixty minutes after a refiner is added to the molten metal in the molten metal producing step.

5. A method for producing the aluminum alloy sheet for a magnetic disk, according to claim 2, the method comprising a molten metal producing step of producing a molten metal using the aluminum alloy, a continuous casting step of casting a cast plate from the produced molten metal by a continuous casting method, and a cold rolling step of cold-rolling the cast plate continuously cast, wherein the continuous casting step is started within one to sixty minutes after a refiner is added to the molten metal in the molten metal producing step.

6. A method for producing the aluminum alloy sheet for a magnetic disk, according to claim 2, the method comprising a molten metal producing step of producing a molten metal using the aluminum alloy, a continuous casting step of casting a cast plate from the produced molten metal by a continuous casting method, and a cold rolling step of cold-rolling the cast plate continuously cast, wherein the continuous casting step is started within one to sixty minutes after a refiner is added to the molten metal in the molten metal producing step.

7. A magnetic disk wherein an electroless Ni—P plating-treated layer and a magnetic substance layer thereon are provided on a surface of an aluminum alloy substrate comprising the aluminum alloy sheet for a magnetic disk, according to claim 2.

8. A method for producing the aluminum alloy sheet for a magnetic disk, according to claim 2, the method comprising a molten metal producing step of producing a molten metal using the aluminum alloy, a semi-continuous casting step of casting an ingot from the produced molten metal by a semi-continuous casting method, a hot rolling step of hot-rolling the ingot, and a cold rolling step of cold-rolling a hot-rolled plate, wherein the semi-continuous casting step is started within one to sixty minutes after a refiner is added to the molten metal in the molten metal producing step.

* * * * *